US008428260B2

(12) United States Patent
Newberg et al.

(10) Patent No.: US 8,428,260 B2
(45) Date of Patent: Apr. 23, 2013

(54) SYSTEM AND METHOD OF INCREASING ENCRYPTION SYNCHRONIZATION AVAILABILITY

(75) Inventors: Donald G. Newberg, Hoffman Estates, IL (US); Ramandeep Ahuja, Chicago, IL (US); Michelle M. Antonelli, Barrington, IL (US); Gregory D. Bishop, St. Charles, IL (US); Peter M. Drozt, Prairie Grove, IL (US); Michael F. Korus, Eden Prairie, MN (US); Peter E. Thomas, Schaumburg, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 790 days.

(21) Appl. No.: 12/645,804

(22) Filed: Dec. 23, 2009

(65) Prior Publication Data

US 2011/0150219 A1 Jun. 23, 2011

(51) Int. Cl.
*H04L 9/16* (2006.01)
(52) U.S. Cl.
USPC ............ 380/261; 380/259; 380/260; 380/274
(58) Field of Classification Search ........... 380/260–261
See application file for complete search history.

(56) References Cited

U.S. PATENT DOCUMENTS

| 5,148,482 | A | * | 9/1992 | Bocci et al. | 380/274 |
|---|---|---|---|---|---|
| 5,361,302 | A | * | 11/1994 | Malek et al. | 380/274 |
| 5,502,767 | A | * | 3/1996 | Sasuta et al. | 380/274 |
| 5,623,491 | A | * | 4/1997 | Skoog | 370/397 |
| 6,141,533 | A | * | 10/2000 | Wilson et al. | 455/11.1 |
| 8,306,069 | B2 | * | 11/2012 | Rousseau | 370/503 |
| 2007/0242670 | A1 | | 10/2007 | Simonson et al. | |
| 2010/0157973 | A1 | | 6/2010 | Bekiares et al. | |
| 2010/0159973 | A1 | | 6/2010 | Thomas | |

OTHER PUBLICATIONS

PCT Search International Search Report Dated Mar. 16, 2011.
P. Lunness: "P25 Radio Systems Training Guide, Revision 1-0-0" (Online); Sep. 2004; pp. I-IV, 1-70, XP002623645; Daniels Electronics Ltd; url: http://www.dvsinc.com/papers/p25_training_guide.pdf> "P25 Encryption" p. 37.
International Preliminary Report pn Patentability and Written Opinion for counterpart International Patent Application No. PCT/US2010/058858 issued on Jun. 26, 2012.
TIA Standard, Project 25, Inter-RF Subsystem Interface Messages and Procedures for Voice and Mobility Management Services; TIA-102.BACA-1; Jan. 2009, 382 Pages.

* cited by examiner

*Primary Examiner* — Matthew Henning
(74) *Attorney, Agent, or Firm* — Steven A. May

(57) ABSTRACT

Methods for increasing encryption synchronization availability include collecting encryption synchronization data from a first superframe received at a gateway. The encryption synchronization data is for decrypting media in a second superframe also received at the gateway. The encryption synchronization data from the first superframe is used to form a composite encryption synchronization codeword for decrypting media in a third superframe formed by the gateway, wherein the third superframe includes the composite encryption synchronization codeword and at least a portion of the media from the second superframe. The third superframe is sent to a receiving device so that media in the third superframe can be decrypted by the receiving device using the composite encryption synchronization codeword that is included in the same superframe as the media that is being decrypted.

18 Claims, 5 Drawing Sheets

SYSTEM AND METHOD OF INCREASING ENCRYPTION SYNCHRONIZATION AVAILABILITY

TECHNICAL FIELD

The present disclosure relates generally to communication systems and in particular to a method of increasing encryption synchronization availability.

BACKGROUND

Efficient, reliable, and real-time communication with minimal latency is a critical requirement for public safety organizations and first responders. Toward that end, the Telecommunications Industry Association (TIA) adopted and standardized a suite of Land Mobile Radio (LMR) standards termed Project 25 (P25), as described for example, in the TIA 102-series documents. The P25 standard defines the operation and interfaces of P25-compliant radio systems. Additionally, through a gateway, non-compliant radio systems can also interoperate with a P25 network.

A radio user can obtain service in a coverage area provided by the user's network or radio frequency subsystem (RFSS). To expand a user's coverage area or provide "roaming" service, the industry/TIA currently proposes use of an inter-radio frequency subsystem interface (ISSI) over an Internet Protocol (IP) network, as described for example, in TIA-102.BACA-A published January 2009 by TIA, and any subsequent revisions. Additionally, apart from roaming, the ISSI enables calling between different networks and systems. Generally, the ISSI is used to provide interoperability between different radio and telecommunications networks, regardless of P25 compliance, so long as the networks support an ISSI interface.

The ISSI is also capable of supporting end-to-end protection of media information, or "encryption". Illustratively, for a receiver to decrypt an incoming encrypted message from a transmitter, the receiver decryption module should be synchronized with the transmitter encryption module. In an ISSI encoded voice message, however, encryption synchronization parameters required for decryption are embedded once at the start of the transmission and in an ongoing manner near the end of each voice superframe due to the nature of the air interface protocol. Furthermore, the encryption synchronization parameters embedded within a given superframe are applicable to the succeeding superframe. Thus, when a user or "subscriber" joins a call later in the synchronization process, the initial encryption synchronization is missed and a late entry condition exists where there is often a significant time delay before the subscriber receives all of the encryption synchronization parameters and is ready to begin decrypting the incoming voice message. Late entry conditions commonly result in significant additional voice truncation for the subscriber.

Accordingly, there is a need for a method of increasing encryption synchronization availability.

BRIEF DESCRIPTION OF THE FIGURES

The accompanying figures, where like reference numerals refer to identical or functionally similar elements throughout the separate views, together with the detailed description below, are incorporated in and form part of the specification and serve to further illustrate various embodiments of concepts that include the claimed invention, and to explain various principles and advantages of those embodiments.

Figure 1:
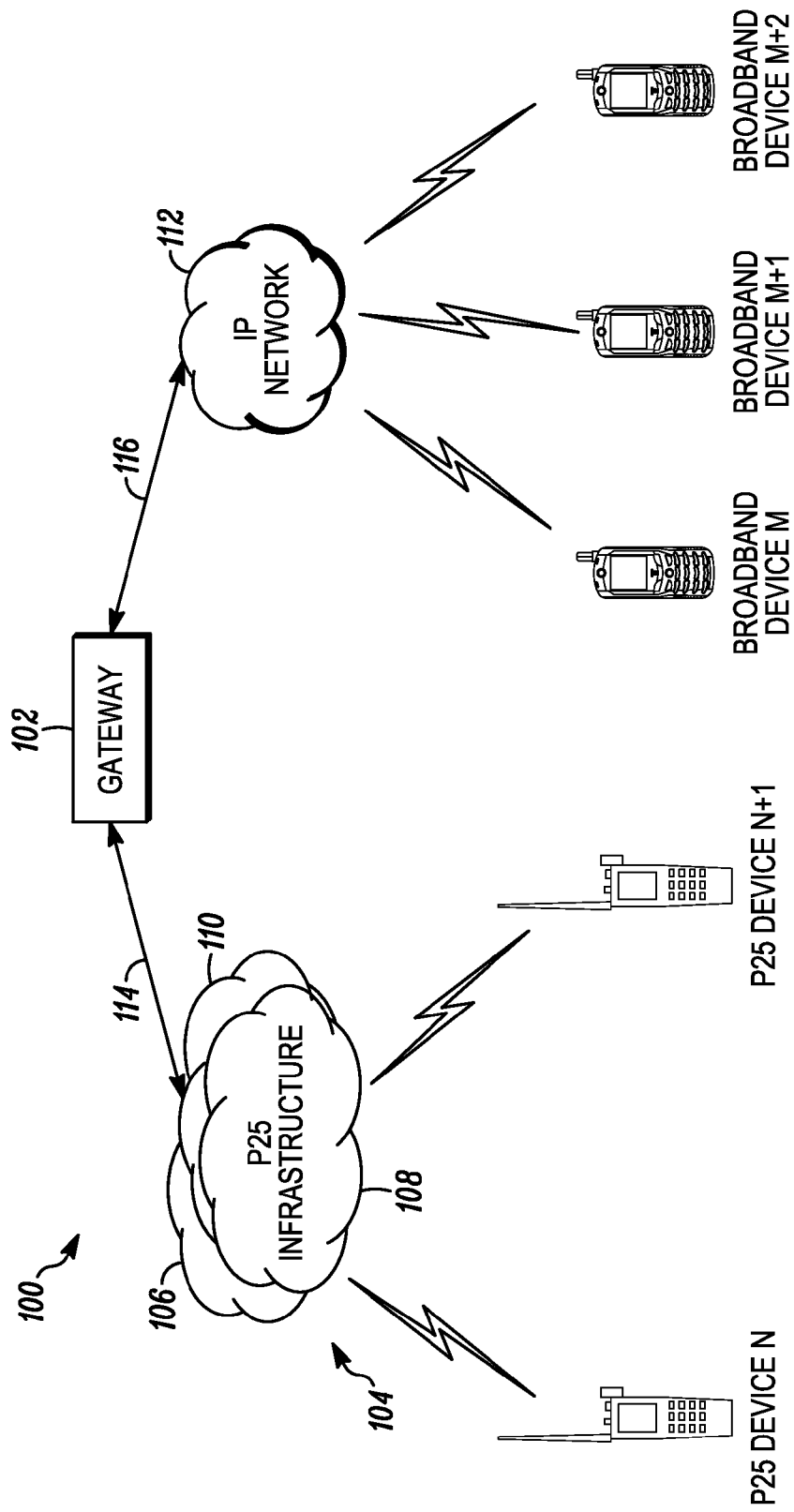
FIG. 1 illustrates a network interoperability system comprising different networks in accordance with one illustrative embodiment.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, the present disclosure provides a method of increasing the availability of encryption synchronization to improve audio decryption response time in a subscriber late entry condition. Illustrative embodiments of the present disclosure, as described below, are applicable to systems and methods for translating between disparate voice protocols. Alternatively, other embodiments are applicable to systems and methods where no translation between protocols occurs. Further, certain advantages of the methods as described herein, are beneficial to subscriber target radios on a voice communication network.

Accordingly, methods for increasing encryption synchronization availability include collecting encryption synchronization data from a first superframe received at a gateway. The encryption synchronization data is for decrypting media in a second superframe also received at the gateway. The encryption synchronization data from the first superframe is decoded (in some cases) by the gateway and used to form a composite encryption synchronization codeword. The composite encryption synchronization codeword is for decrypting media in a third superframe formed by the gateway, wherein the third superframe includes the composite encryption synchronization codeword and at least a portion of the media from the second superframe. The third superframe is sent to a receiving device (also referred to herein as a subscriber and variations thereof). Media in the third superframe can, thereby, be decrypted by the receiving device using the composite encryption synchronization codeword that is included in the same superframe as the media that is being decrypted.

As used herein, the terms "media" and "media stream" refer to any combination of voice, video, and alphanumeric or symbolic text. In some embodiments, as described below, a media stream is transmitted over a voice protocol. Also, as used herein, the term "encryption synchronization codeword" generally refers to an encryption keyword that is used to decrypt a voice message. Furthermore, the term "composite encryption synchronization codeword" generally refers to an encryption synchronization codeword that is formed by a gateway from encryption synchronization data (fragmented or not) collected from a superframe. However, when fragmented, each fragment of the encryption synchronization data constitutes a portion of the encryption keyword that is needed to decrypt the voice message.

As used herein, the term "superframe" refers to a portion of an encrypted voice message, where a plurality of superframes, in addition to headers and other overhead, comprise a complete encrypted voice message. Also, as used herein, the term "logical link data unit" (LDU) refers to a unit of data comprising a plurality of encrypted voice frames that each comprise a portion of the encrypted voice message, as described for example in the TIA 102-series documents. In some embodiments, the encrypted voice frames of the LDU comprise a plurality of data packets or "packets". Further, each superframe comprises a plurality of "logical link data units" (LDU), as discussed below, where at least some of the LDUs comprise encryption synchronization data.

In various embodiments, to reduce additional delay for a subscriber that is joining a call late, it is desirable to include the encryption synchronization codeword more frequently or change an embedding rate, for example within the third superframe. Moreover, changing the embedding rate is desirable as scarce resources are used to transmit the additional signaling required for the composite encryption synchronization codeword. For example, in illustrative embodiments, it is advantageous to reduce the embedding rate of the composite encryption synchronization codeword in cases where a higher embedding rate is unnecessary and/or bandwidth is limited. Thus, a method for determining an encryption synchronization schedule of inclusion within a superframe is as follows.

At a gateway for translating a first media stream to a second media stream, a composite encryption synchronization codeword is embedded within one or more packets of a third superframe at a first embedding rate. In some embodiments, the first media stream comprises a narrowband media stream, and the second media stream comprises a broadband media stream. The first media stream includes a first superframe and a second superframe. The first superframe comprises encryption synchronization data for decrypting media in the second superframe. The second media stream includes the third superframe comprising a plurality of packets. The composite encryption synchronization codeword is formed from the encryption synchronization data of the first superframe. The composite encryption synchronization codeword is for decrypting media in the third superframe. A network event is detected, and the first embedding rate is changed to a second embedding rate for the third (same) superframe and/or for one or more subsequent superframes formed at the gateway. An "embedding rate", as the term is used herein, controls the number of times or instances the composite encryption synchronization codeword is embedded into a superframe formed at the gateway; wherein "embedded" generally means included within the superframe by any suitable means such as by pre-pending, appending, using reserved or available bits, etc.

The methods of increasing encryption synchronization availability, as described in this disclosure, are compliant with established standards and protocols for radio communications, as described, for example, in the TIA 102 series documents. In addition to radio communication over a Common Air Interface (CAI) as described, for example, in TIA-102.BAAA published January 1996 by the TIA, and any subsequent revisions, the P25 standards include an inter-radio frequency subsystem interface (ISSI) over an Internet Protocol (IP), as described for example, in TIA-102.BACA-A published January 2009 by TIA and any subsequent revisions. The ISSI provides/creates wireline interoperability between different radio and telecommunications networks, regardless of P25 compliance, so long as the networks support an ISSI interface.

Furthermore, the described methods are applicable to various other protocols, including alternative network interoperability protocols. Additionally, the systems and methods described herein are capable of providing end-to-end protection of signaling information, or encryption. In some illustrative embodiments, decryption of a voice signal only occurs at a subscriber device. The teachings herein are implemented in systems that employ technologies including, but not limited to, those described in the P25/TIA/ISSI standards. For example, while the ISSI is used to facilitate interoperability between different networks, in some embodiments, the ISSI voice protocol is used to extend communication directly to broadband subscribers. This is discussed in more detail below, for example, with reference to FIG. 1.

Embodiments of the present disclosure advantageously utilize standard IP protocols for voice and control signaling, including Real-Time Transport Protocol (RTP), as described, for example, in Request for Comments (RFC) 3550 dated July 2003 by Internet Engineering Task Force (IETF) and any subsequent revisions, and Session Initiation Protocol (SIP), as described, for example, in RFC 3261 published June 2002 by IETF Network Working Group and any subsequent revisions. However, the embodiments of the present disclosure are not limited by these protocols. Illustratively, in various embodiments as described herein, a packet format is determined according to a plurality of methods rather than by directly re-using existing standard packet formats, such as for example packet formats used for wireless and/or Push-to-talk over Cellular (PoC) applications, as described, for example, in PoC V1.0.3 Enabler Package released September 2009 by Open Mobile Alliance (OMA). Thus, according to embodiments of the present disclosure, the net result is a more efficient network interoperability system with a reduction in voice truncation upon late entry conditions due to more reliable transmission of encryption synchronization information. Those skilled in the art will realize that the above recognized advantages and other advantages described herein are merely illustrative and are not meant to be a complete rendering of all of the advantages of the various embodiments.

Referring now to the figures, FIG. 1 illustrates a network interoperability system 100. In accordance with some embodiments, the network interoperability system 100 comprises different networks. The system 100 provides a general depiction of a physical implementation of various embodiments of the present disclosure. Specifically, in one illustrative embodiment, a gateway 102 is coupled to both a P25 infrastructure 104 and an IP network 112, as indicated by a plurality of arrows 114, 116 respectively. In some embodiments, the P25 infrastructure 104 includes a plurality of P25 networks 106, 108, 110. Optionally, P25 Devices N, N+1 include various combinations of single-band and multi-band radios.

As illustrated, the P25 Devices N, N+1 wirelessly communicate with the P25 infrastructure 104. In some embodiments, the P25 Devices N, N+1 are within one of the plurality of P25 networks 106, 108, 110. In other embodiments, the P25 Devices N, N+1 are spread out among different networks of the plurality of networks 106, 108, 110. In some illustrative embodiments, the P25 networks 106, 108, 110 operate using a narrowband protocol such as the Common Air Interface (CAI) protocol, or other narrowband protocols.

The IP network 112 includes an IP-based Radio Access Network (IP-based RAN), a local area network (LAN)/wide area network (WAN) Enterprise or IP Multimedia Subsystem (IMS) environment, as described in 3GPP Technical Specification (TS) 23.228 and any subsequent revisions. Further, the IP network 112 features any combination of network connectivity devices such as modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other network devices. These network connectivity devices enable the IP network 112 to communicate with a global information system, an intranet, or a plurality of intranets.

In some embodiments, the IP network 112 comprises a broadband network implemented by way of a digital subscriber line (DSL), an integrated service digital network (ISDN), a T-1 line, a satellite connection, an EV-DO connection, or a Worldwide Interoperability for Microwave Access (WiMAX) connection, among others. A plurality of Broadband Devices M, M+1 and M+2 communicate wirelessly with the IP network 112 as shown.

As illustrated in FIG. 1, the P25 Devices N, N+1 and the Broadband Devices M, M+1, M+2 communicate with each other through the gateway 102 by way of the P25 infrastructure 104 and the IP network 112, respectively. In some illustrative embodiments, the P25 networks 106, 108, 110 of the P25 infrastructure 104 operate using the same protocol as the IP network 112. In other embodiments, the P25 networks 106, 108, 110, and the IP network 112 operate using different protocols such that protocol translation is required for communication between the P25 Devices N, N+1 and the Broadband Devices M, M+1, M+2. In some embodiments, the gateway 102 includes a media gateway where such protocol translation is performed. In other embodiments, the gateway 102 includes a media source, for example, when no translation is required. The gateway 102 can comprise any of a plurality of media sources, including, among others, media sources defined by any combination of software and hardware components.

Still referring to FIG. 1, in some embodiments when the P25 Devices N, N+1 are within the same P25 network 106, 108, 110, the P25 Devices N, N+1 communicate directly with one another via their shared network connection. In other embodiments, when the P25 Devices N, N+1 are in different P25 networks 106, 108, 110, the P25 Devices N, N+1 communicate with each other through the gateway 102.

The network interoperability system 100, as described above, greatly expands a subscriber's coverage area and calling targets. Yet, voice truncation might still be an issue for a receiving subscriber, for example, when the receiver decryption module of a subscriber coupled to the IP Network 112 is not synchronized with the transmitter encryption module of a subscriber coupled to the P25 infrastructure 104.

In operation, to begin decrypting an incoming voice message, a subscriber requires a complete encryption synchronization codeword. However, the encryption synchronization parameters or "encryption synchronization codeword" required for decryption is, in some cases, transmitted in fragments spread out among a plurality of packets. In some embodiments, the encryption synchronization codeword is transmitted in fragments due to the nature of the air interface protocol. In other embodiments, the encryption synchronization codeword is transmitted in fragments because of its size. For example, in the case of low bit rate narrowband systems as opposed to broadband systems, the encryption synchronization codeword is especially large when forward error correction (FEC) encoded for over-the-air transmission. Thus, the encryption synchronization codeword is too large to send as one block, and it is broken up into smaller fragments and transmitted over the duration of a voice superframe.

Additionally, the encryption synchronization parameters embedded within a given superframe are only applicable to the following superframe. Thus, for example, when a subscriber on the IP network 112 joins a call late during the transmission of a given superframe, there is often a significant time delay, for example up to 360 ms, before the subscriber receives a complete encryption synchronization codeword and is ready to begin decrypting the incoming voice message. Such time delays associated with late entry can be problematic for encrypted voice messaging. For example, potential difficulties arise where fast call setups within narrowband networks result in audio delay and truncation of broadband client audio while the broadband system pages and establishes bearer paths.

Figure 2:
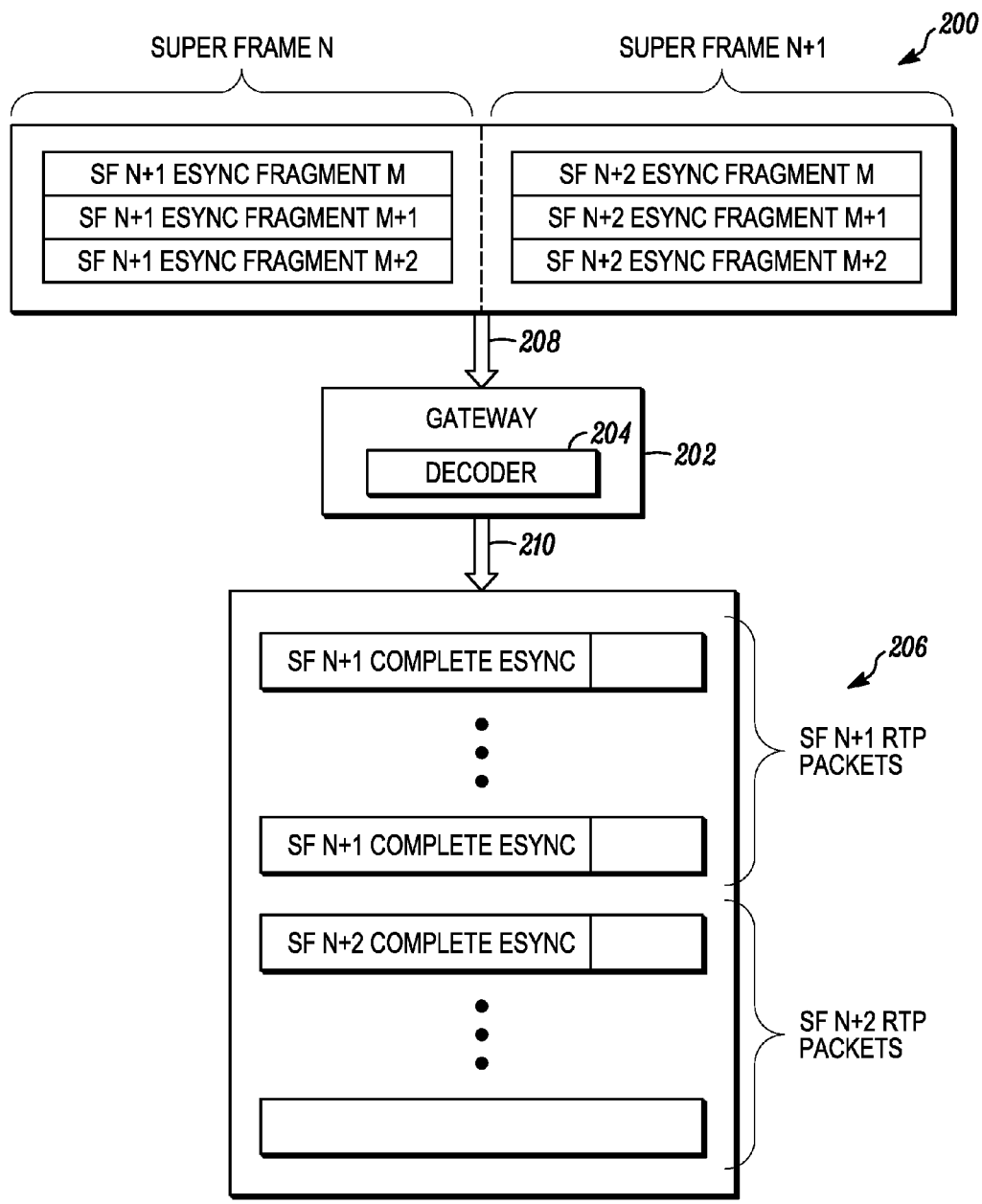
FIG. 2 illustrates a method of providing encryption synchronization information in accordance with some embodiments.

FIG. 2 illustrates a method of providing encryption synchronization information in accordance with some embodiments. A voice protocol 200 includes a plurality of encryption synchronization fragments. The voice protocol 200 also includes a plurality of superframes, such as a plurality of superframes N, N+1, and N+2 (not shown), which collectively define a voice message received at a gateway 202. As described further below, the superframe N of the voice protocol 200 is referred to as a "first superframe"; the superframe N+1 of the voice protocol 200 is referred to as a "second superframe"; and a superframe N+1 of a voice protocol 206 is referred to as a "third superframe". Thus, as shown in FIG. 2, the second superframe corresponds to the third superframe, meaning that at least some of the voice message (the media) from the second superframe is included as the voice media in the third superframe. Stated another way, at least a portion (and sometimes all) of the voice message included within the second superframe is processed by the gateway 202 and becomes the same portion of the voice message included within the third superframe. In some embodiments, as described herein, the voice protocol 200 comprises a "first media stream" and the voice protocol 206 comprises a "second media stream".

Illustratively, the processing at the gateway 202 includes embedding a composite encryption synchronization codeword within the third superframe, as discussed below. In some embodiments, the voice protocol 200 and the voice protocol 206 are disparate voice protocols. In other embodiments, the voice protocol 200 and the voice protocol 206 are the same. In some illustrative embodiments, prior to reaching the gateway 202, the voice message comprises a P25 over-the-air (OTA) circuit voice stream. In some embodiments, the voice message comprises any interface that is based on the air interface protocol. In yet other embodiments, the voice message comprises a packetized ISSI voice packet stream. In various embodiments, the voice message is comprised of a plurality of RTP packets.

By way of example as shown in FIG. 2, the superframe N includes a plurality of encryption synchronization fragments M, M+1, M+2. Each of the fragments M, M+1, M+2 is needed for decrypting media included in the following superframe N+1. Thus, as illustratively shown in FIG. 2, the fragment M of the superframe N that is needed for the superframe N+1 is denoted as "SF N+1 Esync Fragment M". The fragment M+1 of the superframe N that is needed for the superframe N+1 is denoted as "SF N+1 Esync Fragment M+1". Also, the fragment M+2 of the superframe N that is needed for the superframe N+1 is denoted as "SF N+1 Esync Fragment M+2". In a like manner, the encryption synchronization fragments M, M+1, M+2, which comprise the superframe N+1, are needed for decrypting media included in the following superframe N+2 (not shown). Each of the fragments M, M+1, M+2 of the superframe N+1 that are needed for the superframe N+2 are denoted as "SF N+2 Esync Fragment M", "SF N+2 Esync Fragment M+1" and "SF N+2 Esync Fragment M+2", respectively.

The gateway 202 comprises a decoder 204, such as an FEC decoder or any other suitable decoder. Illustratively, the gateway 202 collects the distributed encryption synchronization fragments M, M+1, M+2 of the superframe N as indicated by an arrow 208. In some embodiments, the distributed fragments are collected via the interconnection 114 between the P25 infrastructure 104 and the gateway 102, as indicated by an arrow 114 of FIG. 1. The decoder 204 decodes the collected encryption synchronization fragments M, M+1, M+2 of the superframe N, and consequently forms the composite encryption synchronization codeword. The composite encryption synchronization codeword is needed to decrypt the part of the voice message included within the superframe N+1 of the voice protocol 206. In some embodiments, the voice protocol 200 comprises a narrowband voice protocol. In other embodiments, the voice protocol 206 comprises a broadband voice protocol. In embodiments where the voice protocols 200 and 206 are disparate protocols, translation between the two protocols occurs within the gateway 202.

In further reference to FIG. 2, the composite encryption synchronization codeword is embedded into at least one packet of the voice protocol 206 as indicated by an arrow 210. For illustrative purposes, the voice protocol 206 includes a voice message having a plurality of superframes, such as a plurality of superframes N+1 and N+2. In some embodiments, the superframes of the voice protocol 206 comprise RTP packets.

As shown in FIG. 2, the composite encryption synchronization codeword formed at the gateway 202 by decoding the collected encryption synchronization fragments M, M+1, M+2 of superframe N of the voice protocol 200 is embedded within each of the RTP packets of the superframe N+1 of the voice protocol 206. Thus, if a late entry occurs during the superframe N+1 of the voice protocol 206, the subscriber immediately begins audio decryption of the voice message.

FIG. 2 also illustrates alternative embodiments where a composite encryption synchronization codeword is formed at the gateway 202 by decoding the collected encryption synchronization fragments M, M+1, M+2 of the superframe N+1 of the voice protocol 200. The composite encryption synchronization codeword is embedded within a subset of packets of the superframe N+2 of the voice protocol 206. In some embodiments, as opposed to embedding the composite encryption synchronization code word within one or more packets of a superframe within the voice protocol 206 that include other data such as voice data, at least one packet of the voice protocol 206 (not shown) is exclusively dedicated to conveying a composite encryption synchronization codeword. An encryption synchronization codeword schedule of inclusion within the voice protocol 206 is described below.

Figure 3:
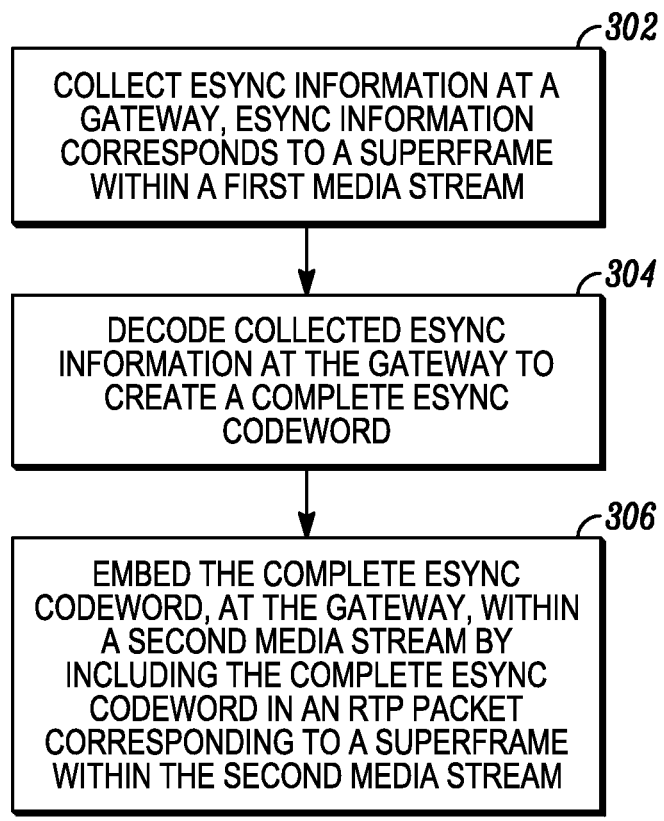
FIG. 3 is a logical flowchart showing an illustrative method for handling encryption synchronization information in accordance with some embodiments.

FIG. 3 shows a logical flowchart showing an illustrative method for handling encryption synchronization information in accordance with some embodiments. Accordingly, the method includes collecting encryption synchronization information or data (this in this illustrative embodiment is fragmented) from a first superframe received at a gateway (at a block 302). The fragmented encryption synchronization information applies to a second superframe also received at the gateway. The first and second superframes relate to a first voice stream. The second superframe corresponds to a third superframe of a second voice stream sent from the gateway to, for example, one or more subscriber devices.

In some embodiments, the first and the second voice streams operate on the same voice protocol. In other embodiments, the first and the second voice streams operate on different voice protocols. In embodiments where the first and the second voice streams operate on different voice protocols, translation between protocols occurs at the gateway. As an example, the second superframe of the first voice stream operating on a narrowband voice protocol is translated to its corresponding third superframe of the second voice stream operating on a broadband voice protocol.

Thereafter, the collected fragmented encryption synchronization information is decoded (if a decoder is used) at the gateway and used to form a composite encryption synchronization codeword (at a block 304). In some embodiments, the collected encryption synchronization information is decoded at a media source, such as, among others, when no translation between voice protocols is required.

Still referring to FIG. 3, the composite encryption synchronization codeword is embedded within the second voice stream (at a block 306). Illustratively, the composite encryption synchronization codeword formed from the encryption synchronization fragments of the first superframe of the first voice stream is included with the third superframe of the second voice stream and used to decrypt voice data within that same superframe. In some embodiments, the composite encryption synchronization codeword is embedded in a standard ISSI header word (block type=5). Thus, the composite encryption synchronization codeword would be available to all broadband subscribers. In other embodiments, the composite encryption synchronization codeword is embedded in a manufacturer specified data block. In such a configuration, the composite encryption synchronization codeword would only be available to broadband subscribers utilizing manufacturer specific communication devices. Illustratively thereafter, when the composite encryption synchronization codeword is provided to a subscriber device, audio decryption can begin.

Figure 4:
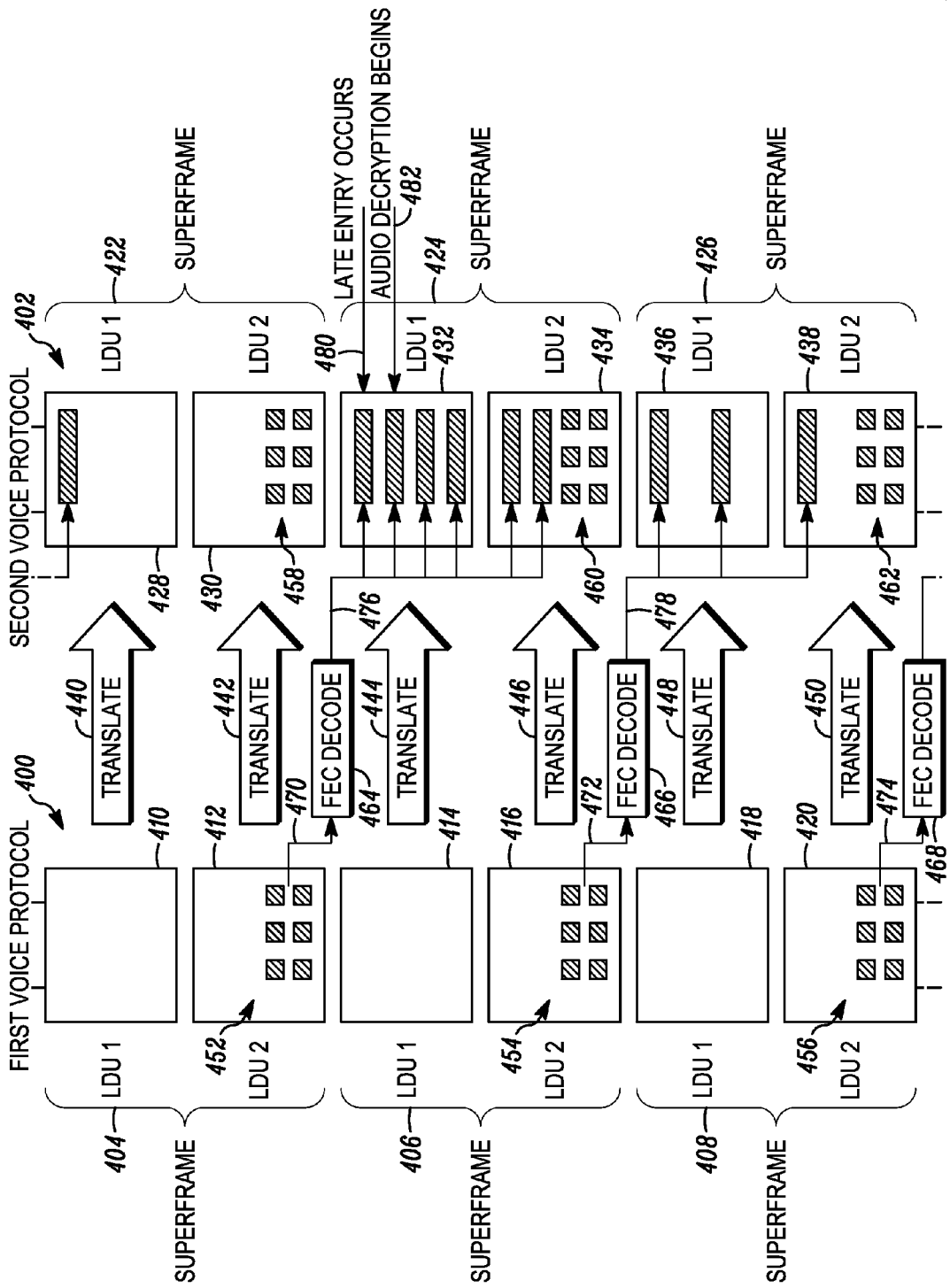
FIG. 4 illustrates a method of embedding encryption synchronization information within a voice protocol in accordance with some embodiments.

FIG. 4 illustrates a method of embedding encryption synchronization information within a voice protocol in accordance with some embodiments. Generally, in addition to embedding a composite encryption synchronization codeword within superframes of a second voice protocol 402, FIG. 4 shows embodiments of the present disclosure where translation from a first voice protocol 400 to a second, different voice protocol 402 occurs as shown by arrows 440, 442, 444, 446, 448, and 450. In some embodiments, the first voice protocol comprises a narrowband voice protocol, and the second voice protocol comprises a broadband voice protocol.

In some embodiments, the first voice protocol 400 includes a plurality of superframes 404, 406, 408. Illustratively, each of the superframes 404, 406, 408 features a plurality of logical link data units (LDU). For example, the superframe 404 includes LDUs 410, 412; the superframe 406 includes LDUs 414, 416; and the superframe 408 includes LDUs 418, 420. Similarly, in some embodiments, the second voice protocol 402 comprises a plurality of superframes 422, 424, 426. Each of the superframes 422, 424, 426 also contains a plurality of LDUs. Illustratively, the superframe 422 includes LDUs 428, 430; the superframe 424 includes LDUs 432, 434; and the superframe 426 includes LDUs 436, 438.

As discussed above with reference to FIG. 1, when each of the P25 Devices and the Broadband devices operate on networks using different protocols, translation between protocols is required for communication between the P25 Devices N, N+1 and the Broadband Devices M, M+1, M+2. For example in FIG. 4, in embodiments where the first voice protocol 400 comprises a narrowband voice protocol and the second voice protocol 402 comprises a broadband voice protocol, the narrowband voice protocol is reformatted and translated into the broadband voice protocol, where the broadband voice protocol is in an appropriate form for use on a broadband system and/or network. Moreover, each superframe within the first voice protocol 400 has a corresponding superframe within the second voice protocol 402. By way of example, the superframe 404 of the first voice protocol 400 corresponds to the superframe 422 of the second voice protocol 402, as indicated by a plurality of arrows 440, 442 showing translation from the superframe 404 to the superframe 422.

FIG. 4 further illustratively shows a plurality of encryption synchronization fragments 452, 454, 456 embedded near the end of each voice superframe 404, 406, 408 (e.g., within LDUs 412, 416, 420, respectively), that comprise the first voice protocol 400. In some embodiments, the encryption synchronization fragments are included in a different area of a superframe and/or are spread out among a plurality of LDUs of a given superframe of the first voice protocol 400. In various embodiments, the encryption synchronization fragments 452, 454, 456 embedded within each of the superframes 404, 406, 408 are applicable to the succeeding superframe. For example, the encryption synchronization fragments 452 of the superframe 404 applies to the following superframe 406, and the encryption synchronization fragments 454 of the superframe 406 applies to the following superframe 408. Moreover, as the superframe 406 in the first voice protocol 400 has a corresponding superframe 424 in the second voice protocol 402, the encryption synchronization fragments 452 also relates to the corresponding superframe 424 as discussed below.

For the embodiment shown in FIG. 4, the encryption synchronization fragments 452, 454, 456 are collected at a gateway and decoded by a single decoder, such as a single FEC decoder. Illustratively, as shown in FIG. 4, the single decoder is represented as a plurality of 'FEC Decode' blocks 464, 466, 468 in order to show that the single decoder is accessed multiple times to decode the encryption synchronization fragments 452, 454, 456. In alternative embodiments, the encryption synchronization fragments 452, 454, 456 are decoded by a plurality of decoders, such as a plurality of FEC decoders. A flow of the collected encryption synchronization fragments 452, 454, 456 to the decoder is indicated by a plurality of arrows 470, 472, 474, respectively. A composite encryption synchronization codeword is formed upon decoding. The composite encryption synchronization codeword is embedded within at least one packet, such as an RTP packet, that is included in a superframe of the second voice protocol 402. The decoder represented by the FEC Decode block 464 decodes the encryption synchronization fragments 452. In some embodiments, the resulting composite encryption synchronization codeword is embedded within each of a plurality of RTP packets of the superframe 424 of the second voice protocol 402, as indicated by a multi-headed arrow 476. Thus, if a late entry 480 occurs during the superframe 424 of the second voice protocol 402, a subscriber immediately begins audio decryption 482 of the voice message.

Moreover, in the embodiment of FIG. 4, the second voice protocol 402 also includes a plurality of encryption synchronization fragments 458, 460, 462 embedded near the end of each voice superframe 422, 424, 426. In various embodiments, the encryption synchronization fragments are included in a different area of the superframe or disbursed among a plurality of LDUs of a given superframe of the second voice protocol 402. The encryption synchronization fragments 458, 460, 462 embedded within each of the superframes 422, 424, 426 are applicable to the following superframe. For example, the encryption synchronization fragments 458 of the superframe 422 applies to the following superframe 424, and the encryption synchronization fragments 460 of the superframe 424 applies to the subsequent superframe 426.

As mentioned above, if a late entry 480 occurs within the superframe 424 of the second voice protocol 402 as shown in FIG. 4, the subscriber immediately begins decrypting 482 the audio message. That is, it is not necessary that the subscriber recover the remainder of the superframe 424 to obtain the encryption synchronization fragments 460 to begin audio decryption at the following superframe 426. FIG. 4 also illustrates alternative embodiments where a composite encryption synchronization codeword is embedded within a subset of a plurality of RTP packets of the second voice protocol 402. For example, the decoder represented by the FEC Decode block 466 decodes the encryption synchronization fragments 454. The resulting composite encryption synchronization codeword is embedded within a subset of RTP packets of the superframe 426 of the second voice protocol 402, as indicated by a multi-headed arrow 478.

In various embodiments, the subscriber initiates audio decryption immediately on receipt of any RTP packet having a composite encryption synchronization codeword header. In yet other embodiments, the subscriber begins audio decryption immediately on receipt of any RTP packet within a superframe in a manner where a composite encryption synchronization codeword was previously received within the same superframe as the RTP packet. In some embodiments, as opposed to embedding a composite encryption synchronization codeword within a packet that includes other data such as voice data, at least one packet of the plurality of packets of the second voice protocol 402 is exclusively dedicated to conveying a composite encryption synchronization codeword. The illustrative methods as described above reduce delay time, resulting in a significant reduction in voice truncation upon late entry conditions. For example, a delay time is reduced by up to 360 ms. An illustrative encryption synchronization codeword schedule of inclusion is discussed below with reference to FIG. 5.

Figure 5:
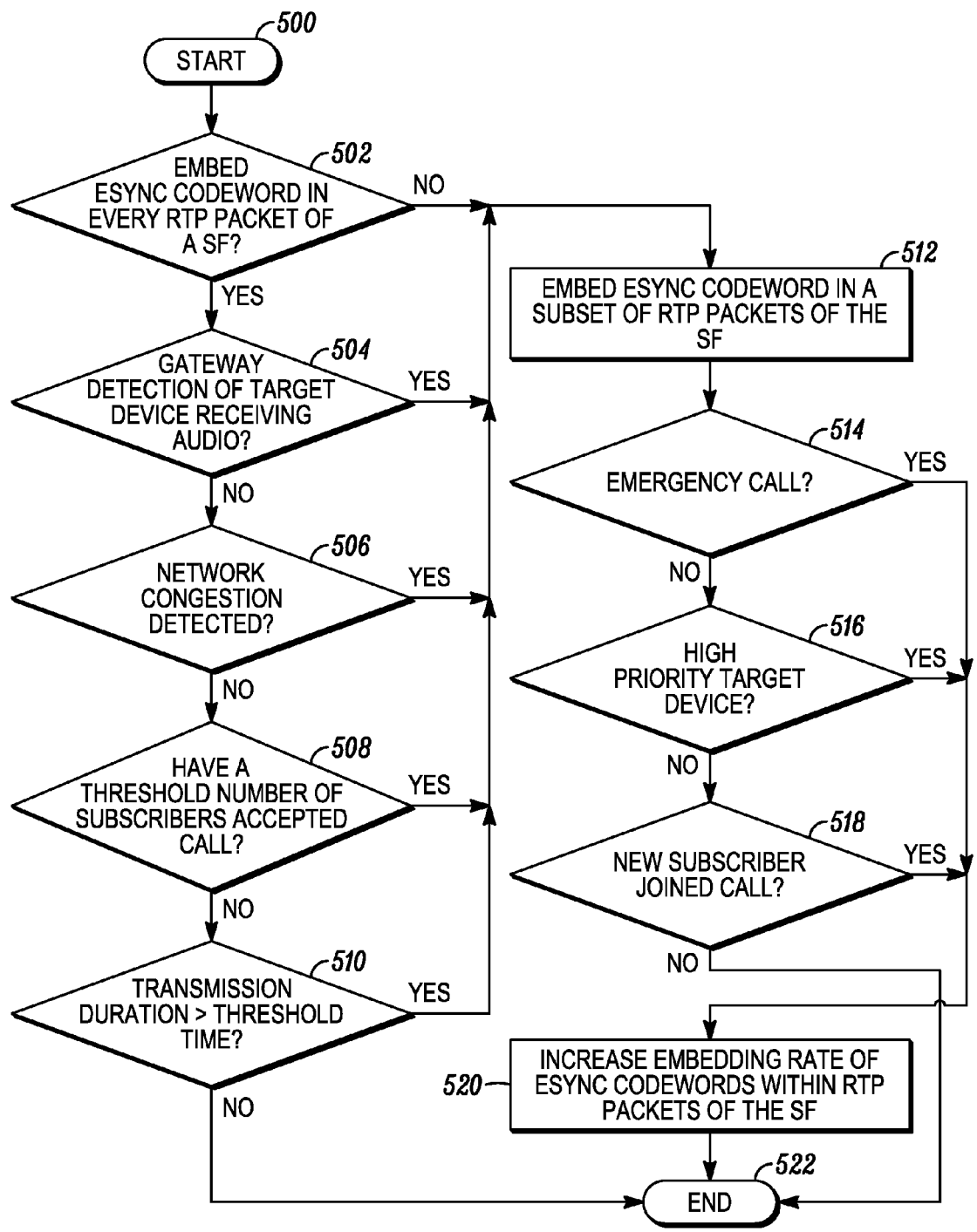
FIG. 5 is a logical flowchart showing an illustrative method for determining an encryption synchronization schedule of inclusion in accordance with some embodiments.

With specific reference to FIG. 5, a logical flowchart shows an illustrative method for determining an encryption synchronization schedule of inclusion within a packet, for example an RTP packet, in accordance with some embodiments. The methods for determining the schedule of inclusion as shown and described herein are merely illustrative and not meant to be limiting in their description. For example, "trigger events" as discussed below are detected at a gateway, or at a media source in various embodiments when translation between different protocols is not required. At a block 500, the method starts and advances to a media source, or for example the gateway. The media source/gateway determines an initial rate for embedding the composite encryption synchronization codeword within packets, for example RTP packets, of a plurality of packets of a given superframe. For example, the gateway determines whether to embed/identifies an opportunity of circumstances for embedding the composite encryption synchronization codeword within each packet of the plurality of packets of the superframe (at a block 502). If the composite encryption synchronization codeword is not embedded within each packet of the superframe, then the composite encryption synchronization codeword is embedded within only a subset of packets of the plurality of packets of the superframe (at a block 512). In some illustrative embodiments, the subset of packets of the plurality of packets of the superframe includes the first packet of the superframe. In various embodiments, the composite encryption synchronization codeword is embedded within a subset of packets to conserve bandwidth.

At the block 502, if the composite encryption synchronization codeword is embedded within each packet of the plurality of packets of the superframe, the method advances to detect a trigger event. Illustratively, the trigger events as discussed below with reference to a plurality of blocks 504, 506, 508, 510, among others, result in a reduction in the encryption synchronization codeword embedding rate for the same superframe and/or one or more subsequent superframes. The trigger events as shown and described with reference to the plurality of blocks 504, 506, 508, 510 are not to be construed as a limiting set of trigger events for which the encryption synchronization codeword embedding rate is reduced or any particular order of detection of such trigger events. For example, in other embodiments, any of a plurality of appropriate trigger events examined in any suitable order results in a reduction in the encryption synchronization codeword embedding rate. Moreover the different triggers may result in the same or a different reduction in the embedding rate.

Specifically, in some embodiments, the gateway detects whether a target device is receiving audio (at the block 504). For example, the gateway detects whether a Broadband Device M, M+1, M+2 (of FIG. 1) is receiving the transmitted audio stream based on RTP Control Protocol (RTCP) quality feedback or call control signaling. If the gateway detects that the target device is receiving audio (at the block 504), then the method advances to embed the composite encryption synchronization codeword within a subset of packets of the plurality of packets of the superframe (at the block 512).

Returning to the block 504, if the gateway does not detect that the target device is receiving audio (at the block 504), then the method advances to detect another trigger event such as network congestion (at the block 506). If the gateway detects network congestion (at the block 506), then the method advances to embed the composite encryption synchronization codeword within a subset of packets of the plurality of packets of the superframe (at the block 512). However, if network congestion is not detected at the block 506, then another trigger event is examined.

For example, the method advances to detect whether a threshold number of subscribers have accepted a call (at the block 508). In some embodiments, the threshold number of subscribers includes all of the subscribers. In other embodiments, the threshold number of subscribers includes a subset of the subscribers. If, at the block 508, the gateway detects a threshold number of subscribers, then the method proceeds to embed the composite encryption synchronization codeword within a subset of packets of the plurality of packets of the superframe (at the block 512).

If the gateway does not detect a threshold number of subscribers (at the block 508), then the process continues to detect another trigger event at the block 510. Specifically, the gateway determines whether a voice stream transmission duration is greater than, or in some embodiments equal to, a threshold time. If the voice stream transmission duration is greater than the threshold time, then the method advances to embed the composite encryption synchronization codeword within a subset of packets of the plurality of packets of the superframe (at the block 512). In some embodiments, as the voice stream transmission duration increases, the encryption synchronization codeword embedding rate within packets of the plurality of packets of the superframe is automatically reduced. Such an embodiment would be useful for a multicast media stream where, for example, the gateway cannot tailor an encryption synchronization codeword embedding rate to each individual subscriber. At the block 510, if the gateway does not detect that the voice stream transmission duration is greater than a threshold time, then the method ends (at a block 522).

Returning to the block 512, where the composite encryption synchronization codeword is embedded within a subset of packets of the plurality of packets of the superframe, the method then advances to detecting other trigger events. The following trigger events with reference to a plurality of blocks 514, 516, 518, among others, result in an increase in the encryption synchronization codeword embedding rate. The trigger events as shown and described with reference to the plurality of blocks 514, 516, 518 are not to be construed as a limiting set of trigger events for which the encryption synchronization codeword embedding rate is increased or any particular order of detecting such trigger events. For example, in other embodiments, any of a plurality of appropriate trigger events examined in any suitable order results in an increase in the encryption synchronization codeword embedding rate. Moreover the different triggers may result in the same or a different increase in the embedding rate.

For example, if the gateway detects an emergency call (at the block 514), then the method advances to increase the encryption synchronization codeword embedding rate within packets of the superframe (at a block 520). If an emergency call is not detected at the block 514, then the method proceeds to determine if a high priority target device is detected (at the block 516) by the gateway among other sources. Illustratively, a high priority device includes, among others, a public safety command officer's device, a group leader's device, or other designated high priority device.

If a high priority target device is detected (at the block 516), the method proceeds to increase the encryption synchronization codeword embedding rate (at the block 520). If, at the block 516, a high priority device is not detected, the method continues to determine whether a new subscriber has joined the call (at the block 518). If the gateway detects that a new subscriber has joined the call at the block 518, then the method proceeds to increase the encryption synchronization codeword embedding rate (at the block 520). However, if the gateway does not detect that a new subscriber has joined the call (at the block 518), the method ends (at the block 522). Similarly, after increasing the encryption synchronization codeword embedding rate at the block 520, the method ends (at the block 522).

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for increasing encryption synchronization availability, the method comprising:
   at a gateway;
   collecting encryption synchronization data from a first superframe, wherein the encryption synchronization data is for decrypting media in a second superframe;
   forming a composite encryption synchronization codeword using the encryption synchronization data from the first superframe, which is for decrypting media in a third superframe;
   forming the third superframe, wherein the third superframe comprises the composite encryption synchronization codeword and at least a portion of the media from the second superframe; and
   providing the third superframe to a receiving device.

2. The method of claim 1, wherein forming the third superframe further comprises embedding the composite encryption synchronization codeword within at least one packet of the third superframe.

3. The method of claim 2, wherein the first and second superframes have a format corresponding to a first communication protocol and the third superframe has a format corresponding to a second different communication protocol.

4. The method of claim 2, wherein the at least one packet comprises at least one Real-Time Transport Protocol (RTP) packet.

5. The method of claim 2 further comprising establishing a rate for embedding the composite encryption synchronization codeword within the at least one packet of the third superframe.

6. The method of claim 5, wherein the third superframe comprises a plurality of packets, and wherein establishing the rate for embedding the composite encryption synchronization codeword comprises:
   during a first time frame, embedding the composite encryption synchronization codeword in a first quantity of packets of the plurality of packets;
   detecting a trigger event; and
   during a second time frame subsequent to the trigger event embedding a composite encryption synchronization codeword in a second quantity of packets, which is different from the first quantity of packets of the third superframe.

7. The method of claim 6, wherein:
during the first time frame, embedding the composite encryption synchronization codeword in each of the plurality of packets;
detecting the trigger event comprises detecting that a target device is receiving the media; and
during the second time frame, discontinuing embedding the composite encryption synchronization codeword in each of the plurality of packets.

8. The method of claim 6, wherein:
during the first time frame, embedding the composite encryption synchronization codeword in each of the plurality of packets;
detecting the trigger event comprises detecting network congestion; and
during the second time frame, embedding the composite encryption synchronization codeword in the second quantity of packets.

9. The method of claim 1, wherein forming the composite encryption synchronization codeword further comprises decoding the encryption synchronization data from the first superframe.

10. The method of claim 1, wherein the first superframe comprises a plurality of packets, and wherein portions of the encryption synchronization data are included in a subset of the plurality of packets.

11. The method of claim 1, wherein the encryption synchronization data is included in a subset of a plurality of logical link data units that comprise the first superframe.

12. The method of claim 1, wherein the third superframe comprises a plurality of packets, and wherein the composite encryption synchronization codeword is embedded within each one of the plurality of packets.

13. The method of claim 1, wherein the third superframe comprises a plurality of packets, and wherein the composite encryption synchronization codeword is embedded within a subset of the plurality of packets.

14. The method of claim 1 further comprising adding at least one dedicated packet to the third superframe to convey the composite encryption synchronization codeword.

15. A method for determining an encryption synchronization schedule of inclusion within a superframe, the method comprising:
at a gateway for translating a first media stream to a second media stream, the first media stream comprising a first superframe and a second superframe, wherein the first superframe comprises encryption synchronization data for decoding media in the second superframe, and the second media stream comprising a third superframe, wherein the third superframe comprises a plurality of packets:
embedding a composite encryption synchronization codeword within the plurality packets of the third superframe at a first embedding rate, wherein the composite encryption synchronization codeword is formed from the encryption synchronization data of the first superframe, and wherein the composite encryption synchronization codeword is for decrypting media in the third superframe;
detecting a network event; and
changing the first embedding rate to a second embedding rate.

16. The method of claim 15 further comprising:
detecting receipt of media at a target device; and
changing the first embedding rate to the second embedding rate, wherein the second embedding rate is different from the first embedding rate.

17. The method of claim 15 further comprising:
detecting at least one of network congestion, a threshold number of subscribers, or a threshold transmission duration; and
changing the first embedding rate to the second embedding rate, wherein the second embedding rate is different from the first embedding rate.

18. The method of claim 15 further comprising:
detecting at least one of a high priority device, an emergency call, or a new subscriber; and
changing the first embedding rate to the second embedding rate, wherein the second embedding rate is different from the first embedding rate.

* * * * *